United States Patent
Gehrmann

(10) Patent No.: US 7,284,127 B2
(45) Date of Patent: Oct. 16, 2007

(54) SECURE COMMUNICATIONS

(75) Inventor: Christian Gehrmann, Lund (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 850 days.

(21) Appl. No.: 10/602,176

(22) Filed: Jun. 24, 2003

(65) Prior Publication Data

US 2004/0083368 A1 Apr. 29, 2004

Related U.S. Application Data

(60) Provisional application No. 60/420,964, filed on Oct. 24, 2002.

(51) Int. Cl.
*H04L 9/00* (2006.01)
*H04K 1/00* (2006.01)

(52) U.S. Cl. ...................................... 713/169; 380/277

(58) Field of Classification Search ...................... None
See application file for complete search history.

(56) References Cited

U.S. PATENT DOCUMENTS

| | | | |
|---|---|---|---|
| 4,200,770 A | | 4/1980 | Hellman et al. |
| 4,423,287 A | * | 12/1983 | Zeidler ........................ 705/71 |
| 5,651,069 A | | 7/1997 | Rogaway ..................... 380/28 |
| 5,664,016 A | | 9/1997 | Preneel et al. ................. 380/28 |
| 6,226,383 B1 | * | 5/2001 | Jablon .......................... 380/30 |
| 6,348,875 B1 | | 2/2002 | Odinak et al. ......... 340/825.52 |
| 6,792,533 B2 | * | 9/2004 | Jablon ......................... 713/171 |
| 7,010,692 B2 | * | 3/2006 | Jablon ......................... 713/171 |
| 7,047,408 B1 | * | 5/2006 | Boyko et al. ................ 713/169 |
| 7,076,656 B2 | * | 7/2006 | MacKenzie ................. 713/171 |
| 2002/0129247 A1 | * | 9/2002 | Jablon ......................... 713/169 |
| 2003/0115464 A1 | | 6/2003 | Nyang et al. |
| 2004/0093496 A1 | * | 5/2004 | Colnot ........................ 713/168 |

(Continued)

FOREIGN PATENT DOCUMENTS

EP 1255372 A1 5/2001

(Continued)

OTHER PUBLICATIONS

Jablon, "Strong Password-Only Authenticated Key Exchange", Sep. 25, 1996, ACM SIGCOMM Computer Communication Review, p. 5-26.*

(Continued)

*Primary Examiner*—Christopher Revak
(74) *Attorney, Agent, or Firm*—Michael Cameron

(57) ABSTRACT

A method of providing secure communications between a first and a second communications unit comprising a key exchange between the communications units resulting in a shared secret key, the key exchange including a user interaction. The method includes the steps of providing, at least partly by means of a user interaction, a passcode to the first and second communications units; generating a first contribution to the shared secret key by the first communications unit and a second contribution to the shared secret key by the second communications unit, and transmitting each generated contribution to the corresponding other communications unit; authenticating the transmitted first and second contributions by the corresponding receiving communications unit based on at least the passcode; and establishing said shared secret key by each of the communications units from at least the corresponding received first or second contribution, only if the corresponding received contribution is authenticated successfully.

32 Claims, 5 Drawing Sheets

U.S. PATENT DOCUMENTS

| | | | |
|---|---|---|---|
| 2004/0176071 A1* | 9/2004 | Gehrmann et al. | 455/411 |
| 2004/0218762 A1* | 11/2004 | Le Saint et al. | 380/277 |
| 2004/0223619 A1* | 11/2004 | Jablon | 380/277 |
| 2006/0064458 A1* | 3/2006 | Gehrmann | 709/203 |

FOREIGN PATENT DOCUMENTS

| | | |
|---|---|---|
| EP | 1134929 A1 * | 9/2001 |
| EP | 1257084 A1 | 11/2001 |
| EP | 1248408 A2 | 10/2002 |
| WO | WO 01/24444 A2 | 5/2001 |
| WO | WO 01/33768 | 5/2001 |
| WO | WO 03/032126 | 4/2003 |

OTHER PUBLICATIONS

International Search Report for PCT/EP03/11220 (mailing date Mar. 11, 2004).

Gehrmann et al.; *Enhancements to Bluetooth Baseband Security*, pp. 1-15, no date provided.

Kabatianskii et al: *On the Cardinality of Systematic Authentication Codes Via Error-Correcting Codes*, In IEEE Transactions On Information Theory, vol. 42, No. 2, Mar. 1996, pp. 566-578.

*Final Techinical Report—Specification of A Security Architecture for Distributed Terminals*, IST-2000-25350-SHAMAN; Nov. 2002, pp. 35-46 of 158.

Lam, et al.: *Message Authentication Codes With Error Correcting Capabilities*, In the International Conference on Information and Communication Security (ICICS), Singapore, Dec. 2002, pp. 1-16.

Gobioff et al.; *Integrity and Performance in Network Attached Storage*, In the Proceedings of the International Symposium on High Performance Computing (ISHPC 99), Tokyo, Japan, 199, pp. 1-22, no date provided.

* cited by examiner

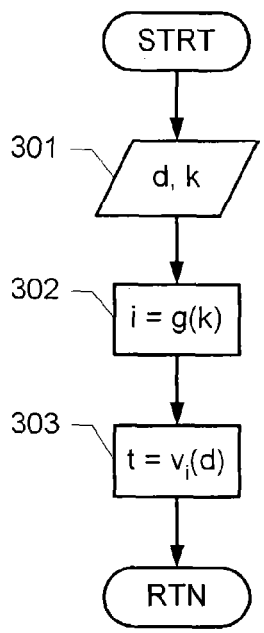
FIG. 3
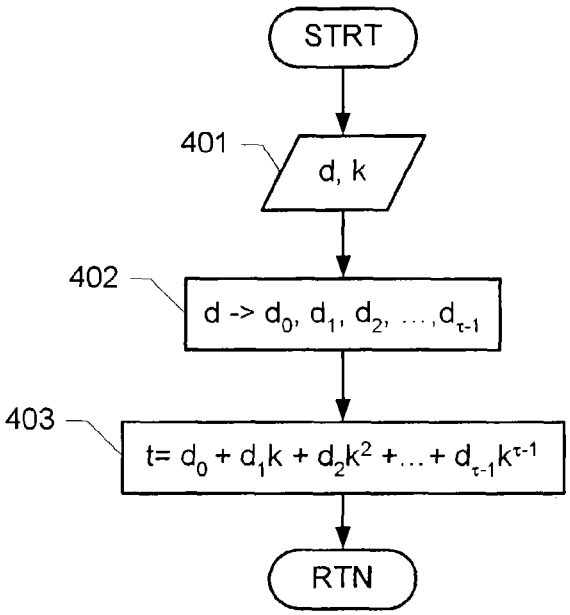
FIG. 4a
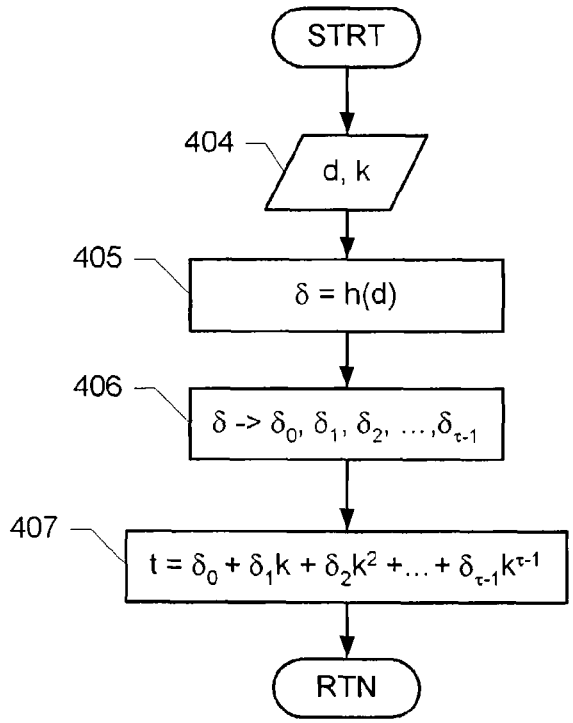
FIG. 4b
| $\log_2|D|$ | $\log_2(n)$ | $P_s$ |
|---|---|---|
| 128 | 16 | $2^{-13} - 2^{-16}$ |
| 256 | 16 | $2^{-12} - 2^{-16}$ |
| 128 | 20 | $2^{-17} - 2^{-20}$ |
| 256 | 20 | $2^{-16} - 2^{-20}$ |
FIG. 5

SECURE COMMUNICATIONS

RELATED APPLICATION

This application claims the priority of U.S. Provisional Application No. 60/420,964 filed on Oct. 24, 2002, the disclosure of which is incorporated herein in its entirety by reference.

FIELD OF THE INVENTION

This invention relates to secure communications between a first communications unit and a second communications unit.

BACKGROUND OF THE INVENTION

In wireless communications systems, the establishment of secure communications between the participating communications units is an important aspect. In many communications systems, a key exchange mechanism is implemented that provides the participating communications units with a common shared secret. Once a shared secret is established between two units, the shared secret may be used to provide encryption and/or integrity protection of the messages communicated between the units.

In many situations, the establishment of secure communications is achieved by a key exchange involving a user interaction such as a user entering a passcode, e.g. a password or a PIN, into one or both communications units. In particular, a user interaction may be necessary in situations where the participating units have not yet established any security relation, such as a shared secret One example of a short-range wireless communications technology is Bluetooth, a radio communications technology operating in the unlicensed ISM (Industrial, Scientific and Medical) band at 2.45 GHz, which is globally available. The band provides 83.5 MHz of radio spectrum. Bluetooth is a technology that provides low cost, low power implementations of radios. Using Bluetooth it is possible to connect personal devices in an ad-hoc fashion in so-called piconets. The Bluetooth standard (see "Baseband Specification" in "Specification of the Bluetooth System, Core, Version 1.1", Bluetooth Special Interest Group, February 2001) further comprises a number of security mechanisms. In particular, the Bluetooth standard provides a pairing mechanism, where two devices that have not been connected before perform a key exchange to establish a shared secret, the so-called link key, between two Bluetooth devices. The link key is derived from a PIN that is entered by the user(s) of the devices. The link key is subsequently used to protect the Bluetooth communication.

The so-called Diffie-Hellman key exchange protocol disclosed in U.S. Pat. No. 4,200,770 provides two devices with a shared secret. According to this protocol, each device generates a secret key, derives a public key from that secret key, and sends the public key to the other device. The shared secret is then generated by each device from its secret key and the corresponding received public key of the other device.

A general problem that may occur with such a key exchange mechanism is that it may be attacked by a man-in-the-middle attack, i.e. a security breach in which a malicious user intercepts and alters the messages between the communicating devices.

The article "Enhancements to Bluetooth baseband security" by C. Gehrmann and K. Nyberg, Proceedings of Nordsec 2001, Copenhagen, November 2001, describes an authentication scheme involving a user interaction. In particular, the above article describes a method of authenticating a shared secret that was previously established by an anonymous Diffie-Hellman key exchange. The method is based on the assumption that, if a man-in-the-middle is present in the Diffie-Hellman key exchange, then the established Diffie-Hellman keys will be different in the legitimate devices. The authentication is based on check values calculated by the two devices based on the established shared secret. The created check values are either displayed on both devices and compared by a user, or the check value calculated by one device is entered into the other device by the user to allow the other device to perform the comparison.

A problem that may occur with one or more of the above prior art systems is that they can necessitate human interaction to authenticate the established shared secret at the time of the establishment of the secure communication. This may not be desired, for example in situations where the actual secure communications should be established fast.

SUMMARY OF THE INVENTION

Some embodiments of the present invention provide a method of providing secure communications between a first and a second communications unit, the method comprising a key exchange between the first and second communications units resulting in a shared secret key, the key exchange including a user interaction; the method includes the steps of:

providing, at least partly by means of a user interaction, a passcode to the first and second communications units;

generating a first contribution to the shared secret key by the first communications unit and a second contribution to the shared secret key by the second communications unit, and transmitting each generated contribution to the corresponding other communications unit;

authenticating the transmitted first and second contributions by the corresponding receiving communications unit based on at least the passcode; and establishing said shared secret key by each of the communications units from at least the corresponding received first or second contribution, only if the corresponding received contribution is authenticated successfully.

The passcode may be determined and provided to the communications units in advance of the actual key exchange and used at a later point in time when the actual key exchange, i.e. the actual creation of the shared secret, takes place. Hence, the need for a user interaction during the actual creation of the shared secret in order to authenticate the shared secret may be eliminated without compromising the security of the method.

Various embodiments of the present invention may also reduce the risk of a man-in-the-middle attack in connection with a key exchange, thereby increasing the security of a communications system.

The passcode may be automatically created, e.g. by the first communications unit, thereby ensuring randomness of the passcode. When the passcode generated by one of the communications units is transferred to the other communications unit via a communications channel involving a user interaction separate from the communications link used for the key exchange, the security is increased, since the risk of an adversary intercepting the separate communications channel as well is low. For example, a separate communications channel involving user interaction may be a telephone line, a mail or a letter sent as a part of a registration process, or the like. The passcode may be short, such as, for example, short enough to be communicated via a man-machine interface or a human-to-human interface. For example, the passcode may be a string comprising less than ten digits and/or letters and/or other symbols, e.g. 4-6 hexadecimal digits, thereby simplifying the communication of the passcode. For example, the passcode may easily be read out from the display of the communications unit that has generated the code, communicated via telephone, by mail or the like, and keyed into another unit, a telephone, a computer, or the like.

Hence, the user interaction involves a user of at least one of the communications units to read out the passcode, e.g. from a display, to enter the passcode, or at least to perform a user input indicative of an authorisation to transfer the passcode, or the like, i.e. the user interaction involves at least outputting of the passcode by one of the communications units or receiving an input by a user, e.g. an input indicative of the passcode. In some embodiments, the user interaction further involves a human-to-human interface, e.g. by communicating the passcode from a user of one device to a user of the other device.

The key exchange may be based on any suitable key exchange mechanism resulting in a shared secret, preferably a shared secret that is long enough to provide sufficient security during the subsequent communications. In one embodiment, the key exchange is a Diffie-Hellman key exchange. Other examples of key exchange mechanisms include the RSA key exchange. The key exchange according to some embodiments of the present invention may be based on general standard key exchange mechanisms.

According to some embodiments of the present invention, the step of authenticating the transmitted first and second contributions includes authenticating the first contribution by calculating a tag value of a message authentication code, the tag value being calculated from the first contribution and the passcode, thereby providing an efficient authentication of the first contribution providing a high level of security and requiring only little computational resources. The message authentication code (MAC) may be an unconditionally secure MAC, i.e. a MAC that substantially cannot be broken even with large computational resources.

According to an even further embodiment, the tag value is calculated by selecting a symbol of a codeword of an error correcting code, e.g. a Reed-Solomon code, the codeword corresponding to the first contribution, and the symbol being identified by the passcode. Hence, a high security of the authentication is provided even for short passcodes.

The authentication may further comprise calculating a hash value of a one-way hash function from the first contribution and calculating said tag value by selecting a symbol of a codeword of an error correcting code, the codeword corresponding to the hash value of the first contribution, and the symbol being identified by the passcode. Hence, the length of the passcode may further be reduced while maintaining a high level of security.

The term communications unit comprises any device or group of devices comprising suitable circuitry for receiving and/or transmitting communications signals, e.g. radio communications signals, to facilitate data communication. Examples of such devices include portable radio communications equipment and other handheld or portable devices. The term portable radio communications equipment includes all equipment such as mobile telephones, pagers, communicators, i.e. electronic organisers, smart phones, personal digital assistants (PDAs), handheld computers, or the like.

Further examples of communications units include stationary communications equipment, for example stationary computers or other electronic equipment including a wireless communications interface. In one embodiment, one of the units may comprise a number of devices. For example, the communications unit may comprise a computer network comprising e.g. an access point that provides wireless access to that computer network, e.g. a LAN.

For example, the communications units may operate according to the Bluetooth technology or any other wireless communications technology, e.g. Wireless LAN.

Further preferred embodiments are disclosed in the dependant claims.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

The present invention can be implemented in different ways including the method described above and in the following, a communications system, and further product means, each yielding one or more of the benefits and advantages described in connection with the first-mentioned method, and each having one or more preferred embodiments corresponding to the preferred embodiments described in connection with the first-mentioned method and disclosed in the dependant claims.

Some embodiments of the present invention provide a communications system for providing secure communications at least between a first and a second communications unit by means of a key exchange between the first and second communications units resulting in a shared secret key, the key exchange including a user interaction, the communications system includes:

means for providing, at least partly by means of a user interaction, a passcode to the first and second communications units;

means for generating a first contribution to the shared secret key by the first communications unit and a second contribution to the shared secret key by the second communications unit;

means for transmitting each generated contribution to the corresponding other communications unit;

means for authenticating the transmitted first and second contributions by the corresponding receiving communications unit based on the passcode; and means for establishing said shared secret key by each of the communications units from at least the corresponding received first or second contribution, only if the corresponding received contribution is authenticated successfully.

Some embodiments of the present invention provide a communications unit for providing secure communications with another communications unit by means of a key exchange resulting in a shared secret key, the key exchange including a user interaction, the communications unit comprising data processing means, user-interface means, and a communications interface, the processing means being adapted to perform the following steps:

generating a passcode to be provided at least partly by means of a user interaction via the user-interface means, to the other communications unit;

generating and transmitting via the communications interface a first contribution to the shared secret key, and receiving via the communications interface a second contribution to the shared secret key, the second contribution being generated by the other communications unit;

authenticating the received second contribution based on the passcode; and establishing said shared secret key from at least the second contribution, only if the received second contribution is authenticated successfully.

Some embodiments of the present invention provide a communications unit for providing secure communications with another communications unit by means of a key exchange resulting in a shared secret key, the key exchange including a user interaction, the communications unit comprising data processing means, storage means, and a communications interface, the processing means being adapted to perform a key exchange resulting in a shared secret key, the key exchange comprising:

receiving, at least partly by means of a user interaction, and storing a passcode generated by another communications unit;

receiving via the communications interface a first contribution to the shared secret key generated by the other communications unit;

authenticating the received first contribution based on the passcode;

if the received first contribution is authenticated successfully, establishing said shared secret key from at least the first contribution, and transmitting via the communications interface a second contribution to the shared secret key.

Here, the term processing means includes any circuit and/or device suitably adapted to perform the above functions. In particular, the above term includes general or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The communications interface may include any suitable circuitry or device for communicating data via a wireless communications channel. For example, the interface may comprise a radio transmitter and receiver, or a transmitter/receiver using another communications technology, e.g. infrared signals, or the like.

The term storage means is intended to include any suitable arrangement or device for data storage, for example an electrically erasable programmable read only memory (EE-PROM), flash memory, erasable programmable read only memory (EPROM), a random access memory (RAM). The storage means may be an integrated part of the communications unit, or it may be connected to said unit, e.g. removably inserted. For example, the storage means may be a removable storage medium, e.g. a memory card, a PCM-CIA card, a smart card, or the like.

BRIEF DESCRIPTION OF THE DRAWINGS

FIG. 3 illustrates a flow diagram of a method of calculating a message authentication code based on an error correcting code.

FIGS. 4a-b illustrate flow diagrams of examples of a method of calculating a message authentication code based on a Reed-Solomon code;

FIG. 5 shows a table illustrating the probabilities of a successful substitution attack for a number of construction examples of the MAC construction of FIGS. 4a-b.

DETAILED DESCRIPTION OF THE PREFERRED EMBODIMENTS

Figure 1:
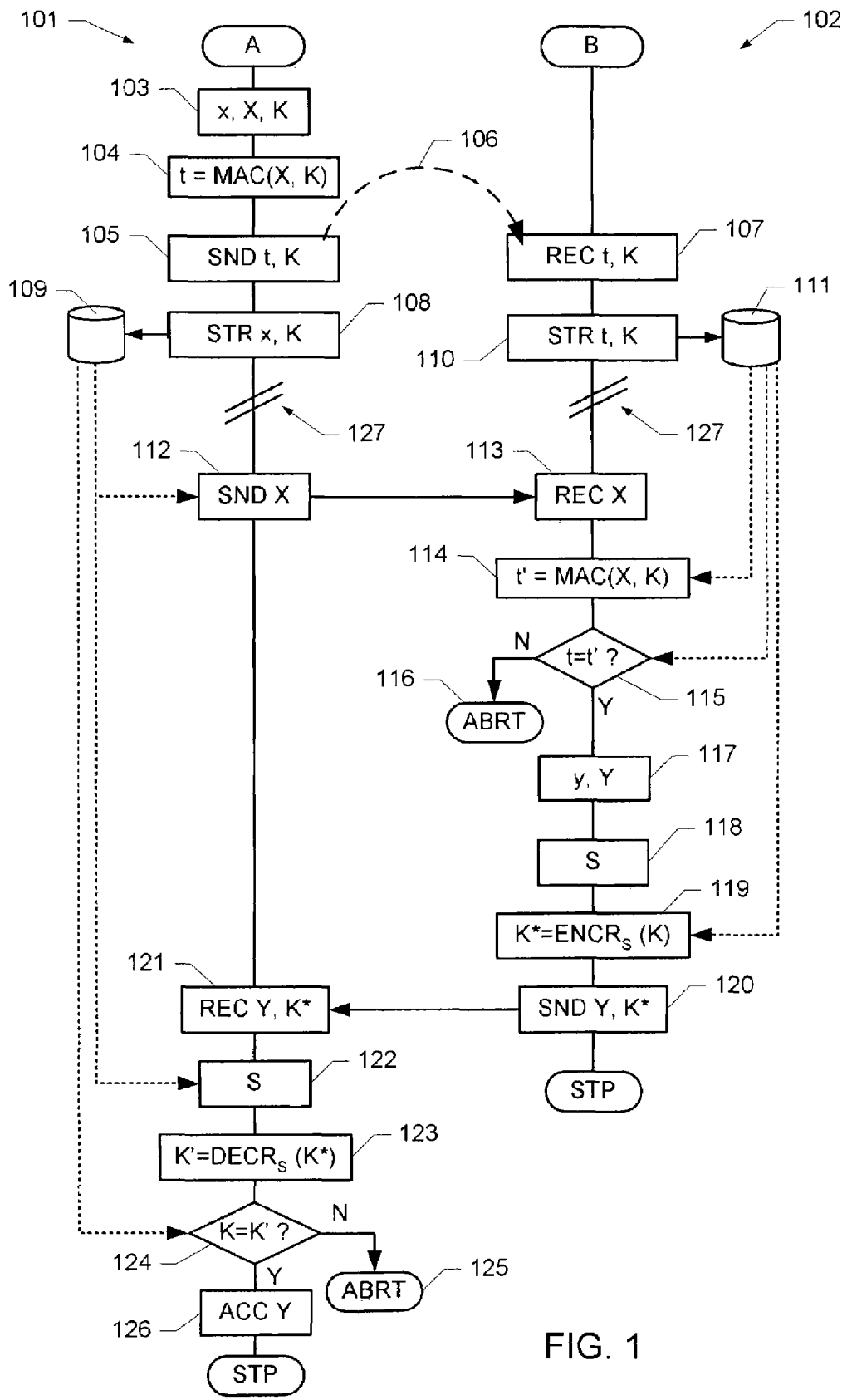
FIG. 1 illustrates a flow diagram of an embodiment of a secure key exchange mechanism.

FIG. 1 illustrates a flow diagram of an embodiment of a secure key exchange mechanism. When two units, generally designated A and B, respectively, are intended to perform a secure key exchange in order to establish a shared secret key, they perform the following steps, where the steps on the left side of the flow diagram, generally designated by reference numeral 101, are performed by unit A, while the steps on the right side of the flow diagram, generally designated by reference numeral 102, are performed by unit B.

The following key exchange is based on the so-called "Diffie-Hellman" method for key agreement. In order to ease understanding of the following description, the Diffie-Hellman key agreement will be briefly described. For a more detailed description reference is made to U.S. Pat. No. 4,200,770, which is included herein in its entirety by reference.

When two units A and B wish to establish a shared secret key, they agree on a prime number p>2 and a base g, which is a primitive mod p. The parameters p and g may be hard-coded into both units, they may be generated by one of the units and communicated to the other unit, they may be retrieved from a third party, or the like. For example, in order to generate p and g, a value of p may be selected, for example as a large random number, e.g. comprising 1000 bits or more, and a known prime test may be performed in order to test whether p is a prime number. If not, a new p may be selected and tested until a prime number is found. Subsequently, a random number g is selected and it is tested whether g is a generator; if not, a new g is selected and tested until a generator is found.

Each unit generates a secret number which is less than p−1. In the following, the secret number generated by unit A will be called x, and the secret number generated by unit B will be called y. Each unit then generates a public key based on the secret value and the above parameters: Unit A generates $X=g^x \bmod p$, where mod designates the modulus function, i.e. the remainder of an integer division. Similarly, unit B generates $Y=g^y \bmod p$.

The units exchange their public keys, and each unit calculates a common secret value S according to:

Unit $A: S=(Y)^x \bmod p$,

Unit $B: S=(X)^y \bmod p$.

Hence, as a result, the units A and B have established a common secret key S without having communicated the secret values x and y, since $(g^y \bmod p)^x \bmod p = (g^x \bmod p)^y \bmod p$.

Now referring to FIG. 1, in an initial step 103 of the key exchange, unit A generates a random number x, a corresponding Diffie-Hellman public key X, and a short secret string K or other passcode. The Diffie-Hellman public key X is calculated as described above based on corresponding parameters g and p, which have been agreed upon by the units A and B. Preferably, the secret string K is determined randomly from a suitable key space, e.g. as a string of 4-6 hexadecimal digits.

In subsequent step 104, unit A uses a message authentication code (MAC) to calculate a tag value t from the public key X. Here, the term message authentication code refers to any suitable function for calculating a tag value from a message to be communicated between a sender and a receiver, where the function is based on a symmetric shared secret between the sender and the receiver. The secret value is called the key. The secret key is an input variable to the MAC calculation. Only somebody who possesses the correct secret key is able to calculate the tag value for an arbitrary message. A tag value of a MAC is an integrity check value that is calculated from the original message data and communicated to the receiver of the message. Upon receiving a message protected by a MAC, the receiver calculates a corresponding tag value on the basis of the received data. If the calculated tag value is equal to the received tag value, the message is accepted as authentic. Examples of known MACs include the so-called Keyed-Hashing for Message Authentication (HMAC) algorithm which is based on cryptographic one-way hash functions such as the secure hash algorithm SHA-1 and the message-digest algorithm MD5. MACs are used to provide data integrity protection in many data communications protocols. An embodiment of a MAC function based on error correcting codes will be described below. In step 104, the input to the MAC function includes the public key X, and the generated secret string K is used as a key for the MAC calculation of the tag value t. It is understood that, in some embodiments, where additional data is communicated during key establishment, the tag value may be calculated from a message including the public key X and the additional data, thereby providing integrity protection for the additional data as well.

In step 105, the generated secret string K and the calculated tag value t are communicated to unit B via a suitable communications channel involving a user interaction, as indicated by the dashed arrow 106 in FIG. 1. For example, the values of K and t may be transferred from unit A to unit B by reading out the values from a display of unit A and by keying in the values into unit B. In another embodiment, the values may be transferred by some other means, e.g. via a telecommunications network, by sending the values as an encrypted message, e.g. an e-mail, an SMS, or the like, or via any other suitable communications channel involving a user interaction, preferably a communications channel different from the communications channel for which the secure communications is to be established. It is an advantage that the units A and B do not have to have a communications link established with each other; they do not even have to be in the proximity of each other. For example, the user of unit A may communicate the secret string and the tag value to the user of unit B by phone, mail, or any other suitable means. Furthermore, the communication of the generated values of K and t may be performed in advance of the time at which the shared secret key is actually to be established between the units, e.g. as part of a registration procedure. In one embodiment, an identifier ID is communicated together with K and t in order to facilitate subsequent retrieval of K and t.

In step 107, unit B receives the values of K and t and, in step 110, stores them in a storage medium 111 of unit B, e.g. an EPROM or EEPROM of a portable device, on a smart card, on a hard disk or any other suitable data storage device.

If the values K and t are related to an identifier ID, the values K and t are stored in relation to that identifier, e.g. using the identifier as an index.

Similarly, in step 108 unit A stores the secret string K, optionally in relation to the identifier ID, in a storage medium 109 of unit A. Furthermore, unit A stores the secret value x, upon which the calculation of the public key X was based.

This concludes the initial registration process. The following steps including the actual key exchange are performed when the units A and B are actually connected via a communications link. This may be immediately after the above initial registration or at a later point in time, as indicated by the lines 127 in FIG. 1.

In step 112, unit A initiates the actual key exchange by transmitting the public key X to unit B via a wireless communications link. In an embodiment where the secret string K was related to an identifier ID, unit A also transmits that identifier. Likewise, if, in step 104, the tag value t was calculated for the public key and some additional data, that additional data is also sent from unit A to unit B.

When unit B receives the public key X from unit A (step 113), in step 114 unit B retrieves the secret string K from the storage medium 111, in one embodiment based on the identifier ID. Unit B calculates the MAC tag value t' of the received public key X and based on the secret string K.

In step 115, unit B compares the calculated tag value t' with the previously stored tag value t. If the tag values are different, the received public key is rejected (step 116). For example, unit B may abort the key exchange by sending a corresponding message to unit A and/or by informing the user about the rejection, e.g. by providing a visual or audible indication. Otherwise, i.e. if the tag values are equal, the public key X is accepted and the process continues at step 117.

In step 117, unit B generates a secret value y and a corresponding Diffie-Hellman public key Y, as described above.

In step 118, unit B generates the corresponding Diffie-Hellman shared secret key $S=(X)^y$ mod p.

In step 119, unit B encrypts the secret string K retrieved from the storage medium 111 using the generated shared secret key S resulting in an encrypted secret string K*. The encryption may be based on any suitable encryption method based on a symmetric secret key, e.g. AES, SAFER+, RC5, DES, 3DES, etc.

In step 120, unit B sends the encrypted secret string K* and the Diffie-Hellman public key Y to unit A. Again, in one embodiment unit B further sends the corresponding identifier ID.

In step 121, unit A receives the encrypted secret string K* and the Diffie-Hellman public key Y.

In step 122, unit A generates the Diffie-Hellman shared secret key $S=(Y)^x$ mod p using the secret value x stored in storage medium 109.

In step 123, unit A uses the generated shared secret key S to decrypt the received encrypted secret string K* to obtain the decrypted secret string K'.

In step 124, unit A compares the received and decrypted secret string K' with the secret string K originally generated by unit A and stored in storage medium 109. If the secret strings are not equal, the received public key Y is rejected, i.e. the generated shared secret key S is discarded (step 125). Otherwise the process continues at step 126.

In step 126, the received public key Y is accepted, i.e. the calculated shared secret key S is accepted as a shared secret. In one embodiment, a corresponding message is sent to unit B, thereby completing the key exchange. The generated shared secret key may now be used to protect the subsequent communication between the units A and B, e.g. by encrypting and/or integrity protecting the messages sent between the units.

It is understood that, in an alternative embodiment, the public key Y communicated from unit B to unit A may be authenticated by a different method, e.g. by calculating a MAC value. It is an advantage of authenticating Y by including the encrypted K* that the same key may be used several times without compromising the security of the method.

Figure 2A:
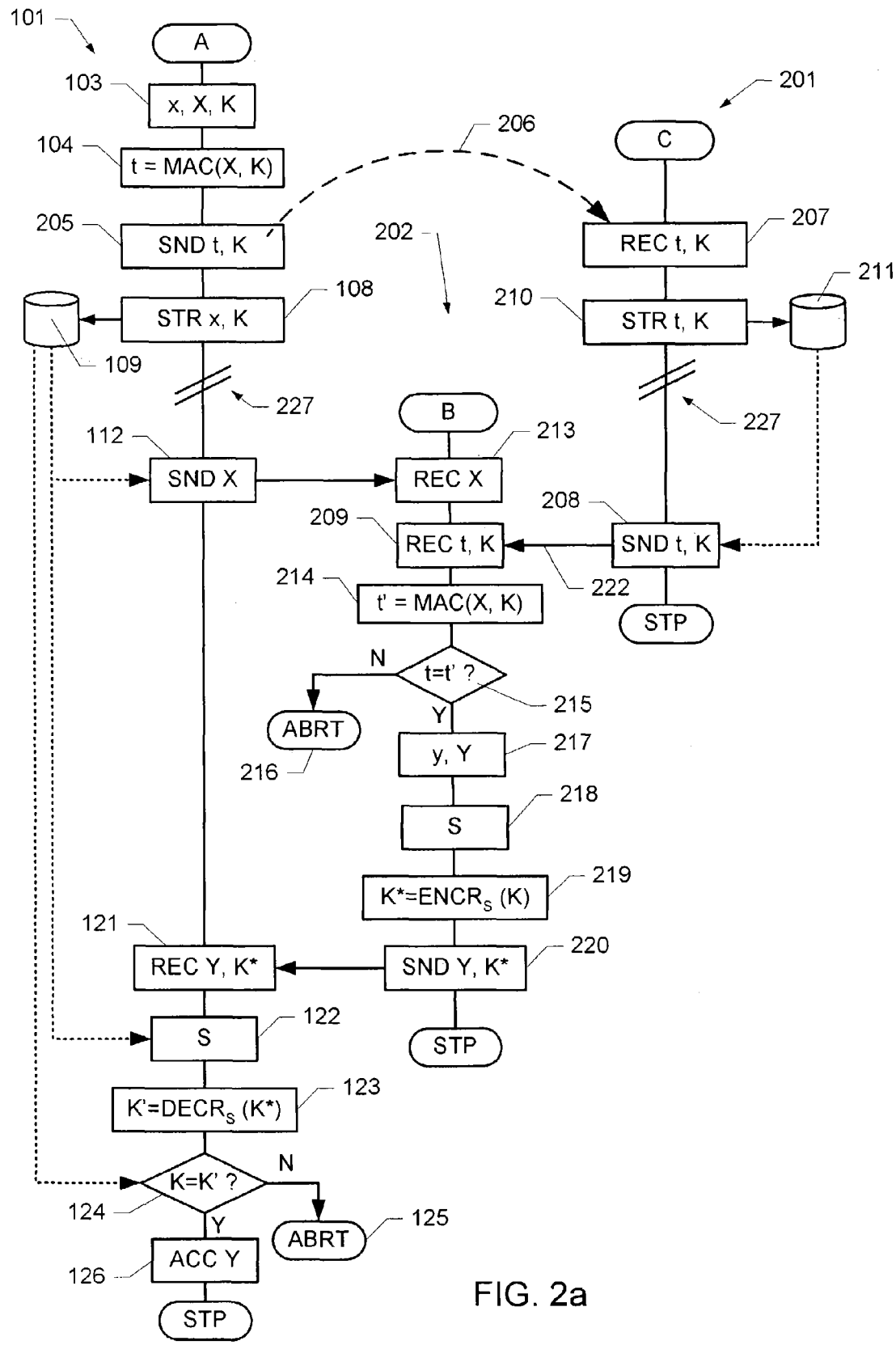
FIGS. 2a-b illustrate flow diagrams of further embodiments of a secure key exchange mechanism.
Figure 2B:
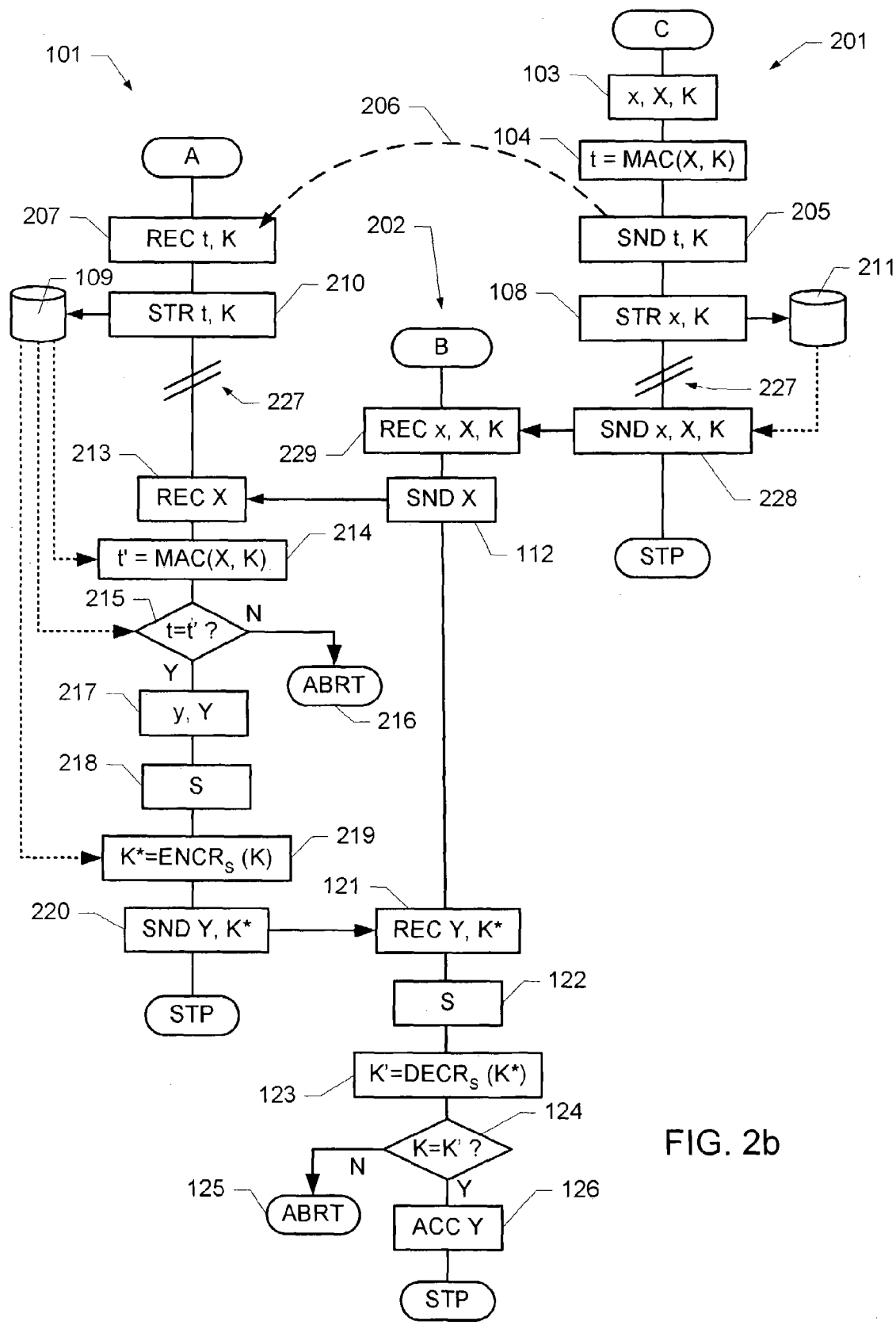

FIGS. 2a-b illustrate flow diagrams of a key exchange mechanism according to further embodiments of the invention. As in the above example, two units perform a secure key exchange in order to establish a shared secret key. In contrast to the previous example, one of the units comprises two devices B and C while the other unit comprises only one device, generally designated device A. The initial registration process is performed between device A and device C. For example, device A may be a portable device such as a mobile telephone, a PDA, or the like, device B may be an access point of a computer network or the like, and device C may be a server computer of the computer network, as will be described in greater detail in connection with FIG. 7 below. Hence, the steps on the left side of the flow diagram in FIGS. 2a-b, generally designated by reference numeral 101, are performed by device A, the steps in the middle of the flow diagram, generally designated by reference numeral 202, are performed by device B, while the steps on the right side of the flow diagram, generally designated by reference numeral 201, are performed by device C. In the examples of FIGS. 2a-b, some of the steps performed by devices A, B, or C correspond to steps performed by unit A of FIG. 1 where the same reference numerals refer to corresponding steps.

Now referring to FIG. 2a, in an initial step 103 device A generates a random number x, a corresponding Diffie-Hellman public key X, and a short secret string K, and, in subsequent step 104, device A uses a message authentication code (MAC) to calculate a tag value t from the public key X and with the secret string K as a key, as described above.

In step 205, the generated secret string K and the calculated tag value t are communicated to device C via a suitable communications channel, as indicated by the dashed arrow 206. This communication corresponds to the communications of the above parameters between devices A and B of FIG. 1 as described with reference to reference numerals 105, 106, and 107 of FIG. 1. In the present embodiment, however, the parameters are communicated between devices A and C involving a user interaction: For example, the values of K and t may be transferred from device A to device C as a part of a registration procedure. In one embodiment, the user of device A may read out the secret string and the tag value from device A and communicate them to a user of device C, e.g. by phone, mail, or any other suitable means. In one embodiment, device A may generate a message comprising the above data and send it to the network operator having authority over the computer network comprising device C and access point B. In one embodiment, an identifier ID is communicated together with K and t in order to facilitate their subsequent retrieval.

In step 207, device C receives the values of K and t and, in step 210, stores them in a storage medium 211, e.g. a key database for managing security related information of the computer network. If the values K and t are related to an identifier ID, the values K and t are stored in relation to that identifier, e.g. using the identifier as an index.

Similarly, in step 108 device A stores the secret string K, possibly in relation to the identifier ID, in a storage medium 109 of device A. Furthermore, device A stores the secret value x, upon which the calculation of the public key X was based. Optionally, device A may further store the public key X. Alternatively, the public key may be re-generated from the private key X at a later point in time.

This concludes the initial registration process between devices A and C. The following steps including the actual key exchange are performed when the devices A and B are actually connected via a communications link. This may be immediately after the above initial registration or at a later point in time, as indicated by the lines 227.

In step 112, device A initiates the actual key exchange with device B by transmitting the public key X and, optionally, additional data to device B via a wireless communications link. In an embodiment where the secret string K was related to an identifier ID, device A also transmits that identifier.

After having received the public key X from device A (step 213), device B retrieves the secret string K and the tag value t from the storage medium 211 (steps 208 and 209). In one embodiment device B may send a request to device C via the computer network, e.g. including the received identifier ID. In response to the request, device C retrieves the tag value and the secret string from the database 211 and sends them to device B (step 208) where they are received (step 209). In another embodiment, device B may have direct access to the database 211 via the computer network and, thus, device B may retrieve the parameters directly from the database. Preferably, the secret string K and the tag value t may be communicated via a secure connection 222, e.g. encrypted and/or via a secure computer network.

In step 214, device B calculates the MAC tag value t' of the received public key X and based on the retrieved secret string K.

In step 215, device B compares the calculated tag value t' with the retrieved tag value t. If the tag values are different, the received public key is rejected (step 216). Otherwise, the public key X is accepted and the process continues at step 217.

In step 217, device B generates a secret value y and a corresponding Diffie-Hellman public key Y, as described above.

In step 218, device B generates the corresponding Diffie-Hellman shared secret key $S=(X)^y \bmod p$.

In step 219, device B encrypts the retrieved secret string K using the generated shared secret key S resulting in an encrypted secret string K*, as described in connection with FIG. 1.

In step 220, device B sends the encrypted secret string K* and the Diffie-Hellman public key Y to device A. Again, in one embodiment device B further sends a corresponding identifier ID.

In step 121, device A receives the encrypted secret string K* and the Diffie-Hellman public key Y.

In step 122, device A generates the Diffie-Hellman shared secret key $S=(Y)^x \bmod p$ using the secret value x stored in storage medium 109.

In step 123, device A uses the generated shared secret key S to decrypt the received encrypted secret string K* to obtain the corresponding decrypted secret string K'.

In step 124, device A compares the received and decrypted secret string K' with the secret string K originally generated by device A and stored in storage medium 109. If the secret strings are not equal, the received public key Y is rejected, i.e. the generated shared secret key S is discarded (step 125). Otherwise the process continues at step 126.

In step 126, the received public key Y is accepted, i.e. the calculated shared secret key S is accepted as shared secret. In one embodiment, a corresponding message is sent to device B, thereby completing the key exchange. The generated shared secret key may now be used to protect the subsequent communication between the devices A and B, e.g. by encrypting and/or integrity protecting the messages sent between the devices.

Now referring to FIG. 2b, in this example, device C, i.e. the network server or the like, initiates the key exchange process. Hence, in this embodiment, devices A and the system comprising devices B and C change roles compared to the example of FIG. 2a, and the steps described in connection with FIG. 2a are now performed by the corresponding other devices. In the following, the corresponding steps are designated by the same reference numbers as in FIG. 2a. In particular, the steps described initial steps 103 and 104 of generating the random number x, the corresponding Diffie-Hellman public key X, and the short secret string K, and calculating the tag value t from the public key X with the secret string K as a key, respectively, are performed by device C, i.e. the network server or the like.

Accordingly, in steps 205 and 207, the generated secret string K and the calculated tag value t are communicated from device C to device A via a suitable communications channel, as described above and indicated by the dashed arrow 206. It is understood that in this embodiment, the network operator initiates the communication.

In step 210, device A stores the received data in a storage medium 109 of device A.

Similarly, in step 108 device C stores the secret string K and the secret value x in storage medium 211, e.g. a key database for managing security related information of the computer network. It is understood that, also in this example, the secret string K and, thus, the related values of x, X, and t may be related to an identifier ID, as described in connection with FIG. 2a.

This concludes the initial registration process between devices A and C. The following steps including the actual key exchange are performed when the devices A and B are actually connected via a communications link. This may be immediately after the above initial registration or at a later point in time, as indicated by the lines 227. Again, in this embodiment, device B initiates the key exchange rather than device A.

Accordingly, device B retrieves the secret string K and the Diffie-Hellman keys x and X from the storage medium 211 (steps 228 and 229). As described above, this may be done via a direct database query, via a request sent to device C via the (secure) computer network, e.g. including the received identifier ID, or the like.

In step 112, the actual key exchange is initiated by device B by transmitting the public key X and, optionally, additional data to device A via a wireless communications link.

In step 213, device A receives the public key X and, in step 214, device B calculates the MAC tag value t' of the received public key X and based on the secret string K stored at device A.

In step 215, device A compares the calculated tag value t' with the previously stored tag value t. If the tag values are different, the received public key is rejected (step 216). Otherwise, the public key X is accepted and the process continues at step 217.

In step 217, device A generates a secret value y and a corresponding Diffie-Hellman public key Y, as described above.

In step 218, device A generates the corresponding Diffie-Hellman shared secret key $S=(X)^y \mod p$.

In step 219, device A encrypts the secret string K using the generated shared secret key S resulting in an encrypted secret string K*, as described in connection with FIG. 1.

In step 220, device A sends the encrypted secret string K* and the Diffie-Hellman public key Y to device B.

In step 121, device B receives the encrypted secret string K* and the Diffie-Hellman public key Y.

In step 122, device B generates the Diffie-Hellman shared secret key $S=(Y)^x \mod p$ using the secret value x retrieved from storage medium 211.

In step 123, device B uses the generated shared secret key S to decrypt the received encrypted secret string K* to obtain the corresponding decrypted secret string K'.

In step 124, device B compares the received and decrypted secret string K' with the secret string K originally generated by device C and retrieved from storage medium 211. If the secret strings are not equal, the received public key Y is rejected, i.e. the generated shared secret key S is discarded (step 125). Otherwise the process continues at step 126.

In step 126, the received public key Y is accepted, i.e. the calculated shared secret key S is accepted as shared secret. In one embodiment, a corresponding message is sent to device A, thereby completing the key exchange. The generated shared secret key may now be used to protect the subsequent communication between the devices A and B, e.g. by encrypting and/or integrity protecting the messages sent between the devices.

It is understood that, in some embodiments, the steps 122, 123, 124, and 126 may be performed by device C instead, thereby avoiding the need of actually implementing the key exchange algorithm in both devices B and C. In this case, device B simply forwards the received key data from device A to device C, e.g. via a secure computer network, where the key data is authenticated and further processed as described above.

Hence, in summary, the above examples disclose a key exchange method between a first communications unit and a second communications unit. The method comprises a registration stage and a key exchange stage. The registration stage comprises generating a first private key value and a corresponding first public key of a key exchange mechanism, preferably a Diffie-Hellman key agreement, by the first communications unit;

generating a passcode by the first communications unit;

calculating a message tag of the first public key according to a message authentication code using the passcode by the first communications unit; and making the passcode and the calculated tag value accessible to the second communications unit.

The actual key exchange stage may be performed at any later point in time when the two units are connected via a communications link and can exchange messages via that communications link. This stage comprises transmitting the first public key by the first communications unit to the second communications unit;

calculating the tag value of the received first public key according to said message authentication code using the passcode by the second communications unit, and accepting the received first public key, if the calculated tag value corresponds to the tag value made accessible to the second communications unit;

generating a second private key value and a corresponding second public key of said key exchange mechanism by the second communications unit;

calculating a shared secret key of said key exchange mechanism from the first public key and the second private key value by the second communications unit;

encrypting the passcode by the second communications unit using the calculated shared secret key;

transmitting the second public key and the encrypted data item by the second communications unit to the first communications unit;

calculating said shared secret key of said key exchange mechanism from the second public key and the first private key value by the first communications unit; and decrypting the transmitted encrypted data item by the first communications unit using the shared secret key calculated by the first communications unit, and accepting the calculated shared secret key if the decrypted data item corresponds to the passcode originally generated by the first communications unit.

FIG. 3 illustrates a flow diagram of a method of calculating a message authentication code based on an error correcting code. In the example of FIG. 3, it is assumed that a data item d from a data space D is to be authenticated using a message authentication code (MAC). The data item d may be a message, e.g. the public key X in the method described above, or a data item derived from a message M by a suitable function h, i.e. d=h(M), as will be discussed in greater detail below. For the purpose of this example, the data item d will also be referred to as message.

In general, a MAC is a mapping f from a data space D and a key space K to a tag space C, i.e. f: D×K→C where a message d∈D and a key k∈K is mapped to a tag t∈C, i.e. (d,k)→t.

A MAC is used to protect the integrity of the message, i.e. to ensure that the data has not been altered during transmission from the sender to the receiver. In manual authentication, short MAC values are used, i.e. tags having a length of less than 10-15 digits and/or characters and/or other symbols, thereby allowing a user to communicate and/or compare the tag values. In such a manual authentication scheme, the security is based on an unconditional security of the MAC function rather than on computational security. For example, if hash functions with long hash codes are used as MAC functions, the security is based on computational security.

The unconditional security of a MAC function may be determined by considering different types of possible attacks. Two main types of attacks that are typically considered are the impersonation attack and the substitution attack. In order to ease the understanding of the following description, these types of attacks will be briefly described here. For a more detailed description reference is made to e.g. G. Kabatianskii, B. Smeets and T Johansson, "On the cardinality of systematic A-codes via error correcting codes", IEEE Transaction on Information, theory, vol. IT-42, pp. 566-578, 1996, which is incorporated herein in its entirety by reference.

In an impersonation attack, the attacker tries to convince a receiver that some data is sent from a legitimate sender without observing any prior data exchange between the legitimate sender and the receiver. In a substitution attack, on the other hand, the attacker first observes some data d and then replaces the observed data with some other data d'≠d. The probabilities for the attacker to succeed in an impersonation attack and a substitution attack are denoted $P_I$ and $P_S$, respectively, and they may be expressed as $$P_I = \max_{c \in C} P(c \text{ is valid}),$$

$$P_S = \max_{\substack{c,c' \in C \\ c \neq c'}} P(c' \text{ is valid} | c \text{ is observed}).$$

In the context of the key exchange protocol described above, the probability for an attacker to replace the observed data d with some other data d' is a relevant measure of the security of the key exchange method, i.e. the probability to replace the public key transmitted from unit A to unit B in the examples of FIGS. 1 and 2a and from unit B to unit A in FIG. 2b with another public key. In this scenario, the attacker succeeds, if d' is accepted by the receiver as valid data. In a short-range wireless communications scenario, such as Bluetooth, both units are physically close to each other and may be restricted to only accept data, if both units have signalled that they are ready. Hence, as in such a scenario the impersonation attack can easily be avoided, the probability of a substitution attack may be regarded as the more relevant measure of security. Furthermore, in the scenario of FIGS. 1 and 2, the tag value calculated by the MAC function is communicated over a separate communications channel different from the communications link over which the data is sent. This is in contrast to a standard MAC scenario, where both the data and the tag value are transmitted and may be observed by an attacker. With these assumptions, the probability of a successful substitution attack may be expressed as $$P_S = \max_{\substack{d,d' \in D \\ d \neq d'}} P(f(d,k) = f(d',k) | d \text{ is observed}).$$

Thus, assuming that the key is chosen uniformly at random from the key space K, the above probability may be expressed as $$P_S = \max_{\substack{d,d' \in D \\ d \neq d'}} \frac{|\{k \in K : f(d,k) = f(d',k)\}|}{|K|},$$

where |·| the cardinality of a set, i.e. |K| is the cardinality of K and the numerator in the above equation is the cardinality of the set of all keys in the key space K yielding the same MAC function for both d and d'. Hence, it follows from the above equation that, in order to provide high security, the collision probability of the MAC function f should be low.

The following examples of MAC constructions are based on error correcting codes. For the purpose of this description error correcting codes over a finite field $F_q$ will be considered. In particular, a q-ary code over $F_q$ with codewords of length n will be considered and denoted by V. In general, the code is a mapping from messages to codewords, such that each message corresponds to a unique codeword and each codeword comprises a number of symbols. Hence, the code V consists of all vectors $v \in V = \{v^{(d)} : d \in D\}$, where $v^{(d)} = (v_1^{(d)}, v_2^{(d)}, \ldots, v_n^{(d)})$, i.e. the $v_i^{(d)} \in F_q$ are the symbols of the codeword $v^{(d)}$.

The Hamming distance $d_H(x,y)$ between two q-ary n-tuples x and y is the number of components of the n-tuples that are not the same, i.e. $d_H(x,y)=|\{i\in\{1,\ldots,n\}:x_i\neq y_i\}|$. The minimum distance of a code V is $$d_H(V) = \min_{\substack{x,y\in V \\ x\neq y}} d_H(x,y),$$

i.e. the minimum distance between all codewords of the code V.

With reference to FIG. 3, an example of a MAC construction based on error correcting codes will be described.

In an initial step 301, the input data to the MAC construction is provided, i.e. the message d to be authenticated and the key k to be used as input to the MAC function.

In step 302, an index $i\in\{1,\ldots,n\}$ is selected as a function g of the key k, i.e. $i=g(k)$. In particular, if the key space K has n elements, i.e. $|K|=n$, each k may uniquely be mapped to one of the symbol indices and each index corresponds to one key. In one embodiment, the key is directly used as an index, i.e. $i=k$.

In step 303, the tag value t is determined as the i-th symbol of the codeword $v^{(d)}$ of the code V that correspond to the message d, i.e.

$$t=f(d,k)=v_i^{(d)}=v_{g(k)}^{(d)}.$$

Hence, the tag value is determined to be a selected symbol of the codeword of an error correcting code, where the codeword is the codeword corresponding to the message and the symbol is specified by the key. Consequently, in the above example, a MAC is obtained with a key space size equal to n and with a message space size equal to the coding space size. Furthermore, the above probability $P_S$ for a substitution attack is given by $$P_S-1=d_H(V)/n.$$

FIGS. 4a-b illustrate flow diagrams of examples of a method of calculating a message authentication code based on a Reed-Solomon code.

The term Reed-Solomon (RS) codes refers to a type of error correcting codes where the code words are defined via a polynomial division with a generator polynomial, see I. S. Reed and G. Solomon, "Polynomial Codes over Certain Finite Fields", journal of Soc. Ind. Appl. Math., vol. 8, pp. 300-304, 1960, which is incorporated herein in its entirety by reference. The term Reed-Solomon code is further intended to comprise variants of the Reed-Solomon code, e.g. so-called generalised Reed-Solomon codes.

In the construction of FIG. 4a, in an initial step 401, the input data to the MAC construction is provided, i.e. the message d to be authenticated and the key k to be used as input to the MAC function.

In step 402, the message is expressed as a q-ary τ-tuple over $F_q$, i.e. $d=d_0, d_1, \ldots, d_{\tau-1}$, where $d_i\in F_q$. Hence, the Reed-Solomon (RS) encoding polynomial corresponding to the message is defined as $$p^{(d)}(x)=d_0+d_1 x+d_2 x^2+\ldots+d_{\tau-1}x^{\tau-1}.$$

In step 403, the tag value of the MAC is calculated by evaluating the polynomial at a point specified by the key k, i.e.

$$t=f(d,k)=v_k^{(d)}=p^{(d)}(k)=d_0+d_1 k+d_2 k^2+\ldots+d_{\tau-1}k^{\tau-1}.$$

Hence, the key k specifies a symbol of the Reed-Solomon code that is used as a tag value. It is understood that, as described above, the symbol may be specified by any suitable function of the key.

It is further noted that, in this construction, the key is selected from the finite field $F_q$, i.e. $k\in F_q$. Consequently, this construction has the following properties: $n=q=|K|$ and $|D|=q^\tau=n^\tau$. Hence, the minimum distance of the above code is $d_H(V)=n-\tau+1$ and, thus, the probability of a successful substitution attack is $P_S=(\tau-1)/n$. It is an advantage of Reed-Solomon codes that they are long codes with a high minimum distance.

The above further implies that the probability $P_S$ increases with the size of the message space D.

FIG. 4b shows a flow diagram of another embodiment of a MAC construction based on a Reed-Solomon code.

Again, according to this construction, in an initial step 404, the input data to the MAC construction is provided, i.e. the message d to be authenticated and the key k to be used as input to the MAC function.

In step 405, a one-way hash function h is applied to the message. For the purpose of this description, the term one-way hash function refers to an algorithm that takes a data item, e.g. a string, as the input and produces a fixed-length binary value (hash) as the output. In particular, this process is irreversible, i.e. finding a data item that has produced a given hash value should be computationally unfeasible. Similarly, it should further be computationally unfeasible to find two arbitrary data items that produce the same hash value. An example of a suitable hash function is the standard Secure Hash Algorithm SHA-1. The SHA-1 algorithm takes a message of less than 264 bits in length and produces a 160-bit message digest. Other examples of one-way hash functions include MD4, MD5, and the like. The output of the hash function $\delta=h(d)$ is then used as an input to the Reed-Solomon code. In one embodiment, the output of the hash function is truncated to further reduce the effective message size.

Hence, in step 406, the hash value δ expressed as a q-ary τ-tuple over $F_q$, i.e. $\delta=\delta_0, \delta_1, \ldots, \delta_{\tau-1}$, where $\delta_i\in F_q$.

In step 407, the tag value t of the MAC is calculated by evaluating the corresponding Reed-Solomon encoding polynomial at a point specified by the key k, i.e.

$$t=f(\delta,k)=v_k^{(\delta)}=p^{(\delta)}(k)=\delta_0+\delta_1 k+\delta_2 k^2+\ldots+\delta_{\tau-1}k^{\tau-1}.$$

Hence, by first applying a one-way hash function like SHA-1 to the message, the size of the message space is reduced, thereby reducing the probability $P_S$ of a successful substitution attack without considerably increasing the key length or the length of the output of the MAC, i.e. the length of the tag. Consequently, a secure authentication is provided even for short keys and short message tags, thereby allowing the communication of the key and the message tags via a user interaction.

FIG. 5 shows a table illustrating the probabilities of a successful substitution attack for a number of construction examples of the MAC construction of FIGS. 4a-b. The first column designated $\log_2|D|$ comprises the size of the message as number of bits, the second column designated $\log_2(n)$ shows the key size in terms of the number of bits, while the last column shows the corresponding probability of a successful substitution attack. For example, a code having a code length of four hexadecimal digits and a key size of four digits ($n=q=16^4$, i.e. $\log_2(n)=16$) yields a forgery probability of around $2^{-13}$ to $2^{-16}$ for messages that are 128 bits long. Hence, a SHA-1 output truncated to 128 bits and a key size and code size of 4 hexadecimal bits yields a sufficiently high security. If the key size is increased to 5 digits ($\log_2(n)=20$), the probability decreases further to around $2^{-17}$ or less.

Figure 6:
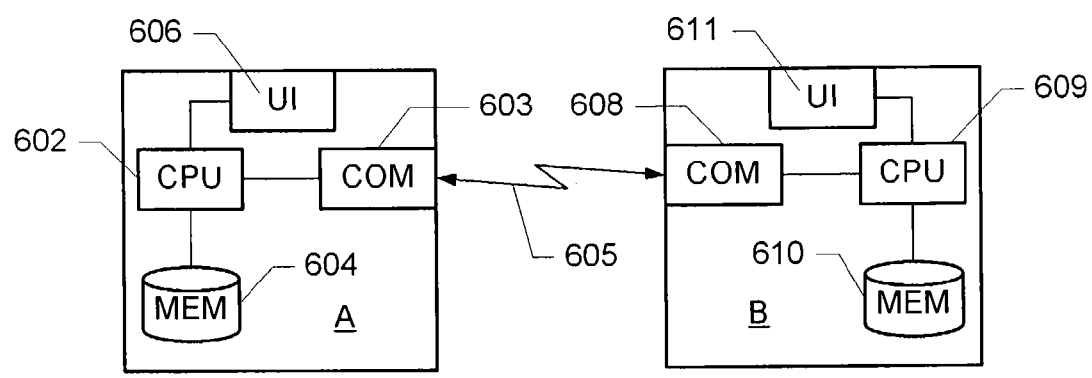
FIG. 6 shows a block diagram of two communications units.

FIG. 6 shows a block diagram of a communications system including two communications units generally designated A and B. The communications unit A and the communications unit B communicate with each other via a communications link 605.

The communications unit A comprises a processing unit 602, a radio communications unit 603 connected to the processing unit, a storage medium 604 connected to the processing unit, and a user interface 606 connected to the processing unit.

The radio communications unit 603 transmits the data received from the processing unit 602 via the radio link 605 to the communications unit 607, and it receives data from the radio link and forwards them to the processing unit. For example, the radio communications unit 603 may be based on the Bluetooth technology and transmit/receive in the ISM band at 2.45 GHz.

The processing unit 602, e.g. a suitably programmed microprocessor, processes the data received from other units and the data to be sent to other units according to the functionality implemented by the communications unit A. In particular, the processing unit 602 is suitably programmed to perform the security functions described above, in particular the generation of a passcode and corresponding tag value, the key exchange and authentication method described above.

The storage medium 604, e.g. an EPROM, EEPROM, flash memory, or the like, is adapted to store the passcode K as well as the necessary parameters for the key exchange protocol.

The user interface 606 comprises a display for displaying the generated passcode K and the corresponding tag value t, such that a user may read out the generated values and transfer them to the communications unit B. Additionally, the user interface 606 may comprise data input means, such as a keyboard, a keypad, a pointing device; a touch screen, or the like.

The communications unit B comprises a processing unit 609, a radio communications unit 608 connected to the processing unit, a storage medium 610 connected to the processing unit, and a user interface 611 connected to the processing unit.

The radio communications unit 609 corresponds to the radio communications unit 603 of communications unit A, thereby allowing radio communication between the radio communications units A and B.

The processing unit 609 processes the data received other units and the data to be sent to other units according to the functionality implemented by the communications unit. In particular, the processing unit is suitably programmed to perform the security functions described above, in particular the key exchange and authentication method described above and corresponding to the key exchange protocol and authentication mechanism implemented by unit A.

Likewise, the storage medium 604, e.g. an EPROM, EEPROM, flash memory, or the like, is adapted to store the passcode K, the tag value t, as well as the necessary parameters for the key exchange prototcol.

The user interface 611 comprises an input device, e.g. a keypad, a keyboard, a touch screen, or the like allowing a user to enter the passcode K and the corresponding tag value t generated by communications unit A. Additionally, the user interface may comprise a display, a pointing device, and/or the like.

Hence, the communications system of FIG. 6 comprises two communications units, e.g. two portable communications devices such as mobile telephones, a mobile telephone and a portable computer, two portable computers, or any combination of similar electronic equipment that establish secure communications via communications link 605 by establishing a shared secret key according to the method described above.

In one embodiment, the processing units and/or the storage media may be removably inserted in the corresponding communications unit, thereby allowing, the security association to be established independent of the actual unit. For example the storage medium and/or processing unit may be constituted by a smart card, e.g. a SIM card.

It is further noted that the communications units may comprise further components which have been omitted in the schematic block diagram of FIG. 6. For example, the communications units may further comprise an automatic gain control (AGC) unit connected to the receiver, a decoder, an encoder, or the like.

Figure 7:
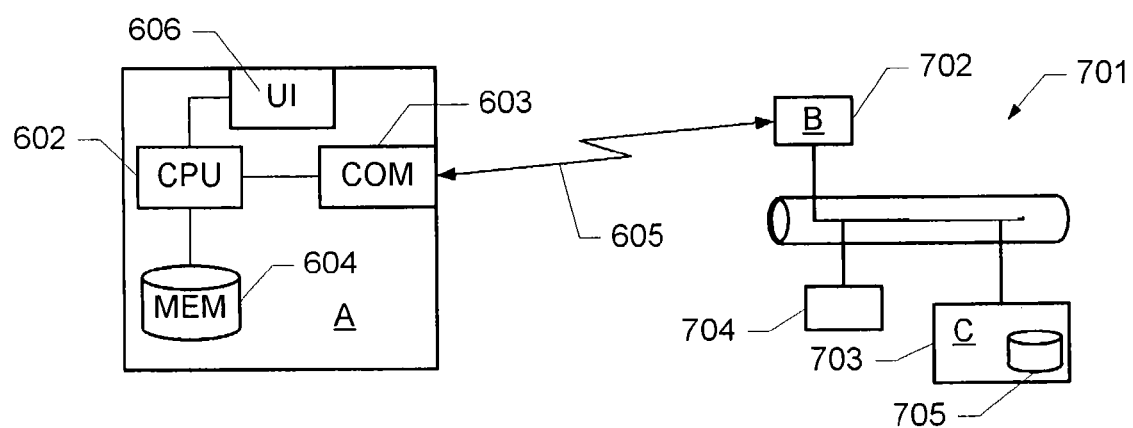
FIG. 7 shows a block diagram of a portable communications unit communicating with a computer network via an access point of the computer network.

FIG. 7 shows a block diagram of a portable communications unit communicating with a computer network via an access point of the computer network.

The communications unit A corresponds to the communications unit A described in connection with FIG. 6. The communications unit A comprises a processing unit 602, a radio communications unit 603 connected to the processing unit, a storage medium 604 connected to the processing unit, and a user interface 606 connected to the processing unit. These components have been described in greater detail above.

The communications unit A communicates with the access point 702 of a communications network 701 via a wireless communications link 605. For example, the communications network 701 may be a wireless LAN, a wired LAN providing wireless access via one or more access points, or the like. In FIG. 7, further network components are exemplified by two network nodes 703 and 704, respectively. In the example of FIG. 7, the network node 703 is a network server computer hosting a key database 705 of passcodes and tag values corresponding to a number of units that may access the computer network 701 via a wireless link. Hence, when unit A wishes to register with the computer network according to the procedure described in connection with FIGS. 2a-b, the network server 703 may play the role of device C in that procedure. For example, according to the embodiment of FIG. 2b, when the network server 703 has generated a passkey K and a tag value t, the values may be transferred to the unit A. For example, the transfer may be caused by an operator as part of an initialisation procedure, by communicating the data to a user of unit A via telephone, by sending a mail, or the like. The parameters are then entered into unit A. Furthermore, the data are stored in database 705. When unit A establishes a connection with the access point B, the stored parameters are retrieved and used in the secure key exchange process of FIG. 2b

In an alternative embodiment, the access point B includes or has direct access to the key database, and the registration process is directly performed between unit A and the access point B as described in connection with FIG. 1.

It should be emphasized that the term "comprises/comprising" when used in this specification is taken to specify the presence of stated features, integers, steps or components but does not preclude the presence or addition of one or more other features, integers, steps, components or groups thereof.

Although preferred embodiments of the present invention have been described and shown, the invention is not restricted to them, but may also be embodied in other ways within the scope of the subject matter defined in the following claims.

The invention can be implemented by means of hardware comprising several distinct elements, and by means of a suitably programmed computer. In the device claims enumerating several means, several of these means can be embodied by one and the same item of hardware, e.g. a suitably programmed microprocessor or computer, one or more user interfaces, and/or one or more communications interfaces as described herein. The mere fact that certain measures are recited in mutually different dependent claims does not indicate that a combination of these measures cannot be used to advantage.

That which is claimed is:

1. A method of providing secure communications between a first and a second communications unit, the method comprising a key exchange between the first and second communications units resulting in a shared secret key, the key exchange including a user interaction, the method comprising the steps of:
   providing, at least partly by means of a user interaction, a passcode to the first and second communications units;
   generating a first contribution to the shared secret key by the first communications unit and a second contribution to the shared secret key by the second communications unit;
   transmitting each generated contribution to the corresponding other communications unit;
   authenticating, using a message authentication code and the passcode, the transmitted first and second contributions by the corresponding receiving communications unit; and
   establishing said shared secret key by each of the communications units from at least the corresponding received first or second contribution, only if the corresponding received contribution is authenticated successfully.

2. A method according to claim 1, wherein the passcode is short enough to be communicated via a user interaction.

3. A method of providing secure communications between a first and a second communications unit, the method comprising a key exchange between the first and second communications units resulting in a shared secret key, the key exchange including a user interaction, the method comprising the steps of:
   providing, at least partly by means of a user interaction, a passcode to the first and second communications units;
   generating a first contribution to the shared secret key by the first communications unit and a second contribution to the shared secret key by the second communications unit;
   transmitting each generated contribution to the corresponding other communications unit;
   authenticating, using a message authentication code and the passcode, the transmitted first and second contributions by the corresponding receiving communications unit;
   establishing said shared secret key by each of the communications units from at least the corresponding received first or second contribution, only if the corresponding received contribution is authenticated successfully;
   encrypting the passcode by the second communications unit using the generated shared secret key;
   transmitting the encrypted passcode to the first communications unit together with the generated second contribution;
   decrypting the received encrypted passcode by the first communications unit; and
   comparing the decrypted received passcode with the passcode provided to the first communications unit to authenticate the received second contribution.

4. A method according to claim 1, wherein the first and second contributions are first and second public keys of a Diffie-Hellman key exchange protocol.

5. A method according to claim 1, wherein the step of providing a passcode to the first and second communications units comprises generating a passcode by the first communications unit and providing the generated passcode to the second communications unit via a communications channel including a user interaction.

6. A method according to claim 1, wherein the step of authenticating the transmitted first and second contributions comprises authenticating the first contribution by calculating a tag value of a message authentication code, the tag value being calculated from the first contribution and the passcode.

7. A method according to claim 6, wherein the tag value is calculated by selecting a symbol of a codeword of an error correcting code, the codeword corresponding to the first contribution, and the symbol being identified by the passcode.

8. A method according to claim 7, further comprising calculating a hash value of a one-way hash function from the first contribution and calculating said tag value by selecting a symbol of a codeword of an error correcting code, the codeword corresponding to the hash value of the first contribution, and the symbol being identified by the passcode.

9. A method according to claim 7, wherein the error correcting code is a Reed-Solomon code.

10. A method of providing secure communications between a first and a second communications unit, the method comprising a key exchange between the first and second communications units resulting in a shared secret key, the key exchange including a user interaction, the method comprising the steps of:
    providing, at least partly by means of a user interaction, a passcode to the first and second communications units;
    generating a first contribution to the shared secret key by the first communications unit and a second contribution to the shared secret key by the second communications unit;
    authenticating, using a message authentication code and the passcode, the transmitted first contributions by the second communications unit
    generating the shared secret key from at least the received first contribution, if the received first contribution is accepted as authentic;
    transmitting a second contribution to the shared secret key generated by the second communications unit to the first communications unit;
    and authenticating, using a message authentication code and the passcode, the received second contribution by the first communications unit; and
    generating the shared secret key by the second communications unit only if the received first contribution is accepted as authentic.

11. A method according to claim 10, wherein the method further comprises:
    calculating a first message tag of a message authentication code from the first contribution using the passcode as a key;

and providing the calculated first message tag to the second communications unit;

and wherein the step of authenticating the received first contribution by the second communications unit based on the passcode comprises:

calculating a second message tag of said message authentication code from the received first contribution using the passcode as a key; and comparing the first and second message tag to authenticate the received first contribution.

12. A method of providing secure communications between a first communications unit and a second communications unit, the method comprising a registration step and a key exchange step, wherein the registration step comprises:

generating a first private key value and a corresponding first public key of a key exchange mechanism by the first communications unit;

generating a passcode by the first communications unit;

calculating a message tag of the first public key according to a message authentication code using the passcode by the first communications unit;

making the passcode and the calculated tag value accessible to the second communications unit at least partly by means of a user interaction;

and the key exchange step comprises:

transmitting the first public key by the first communications unit to the second communications unit;

calculating the tag value of the received first public key according to said message authentication code using the passcode by the second communications unit, and accepting the received first public key if the calculated tag value corresponds to the communicated tag value;

generating a second private key value and a corresponding second public key of said key exchange mechanism by the second communications unit;

calculating a shared secret key of said key exchange mechanism from the first public key and the second private key value by the second communications unit;

encrypting the passcode by the second communications unit using the calculated shared secret key;

transmitting the second public key and the encrypted passcode by the second communications unit to the first communications unit;

calculating said shared secret key of said key exchange mechanism from the second public key and the first private key value by the first communications unit; and decrypting the transmitted encrypted passcode by the first communications unit using the shared secret key calculated by the first communications unit, and accepting the calculated shared secret key if the decrypted passcode corresponds to the passcode originally generated by the first communications unit.

13. A communications system for providing secure communications at least between a first and a second communications unit by means of a key exchange between the first and second communications units resulting in a shared secret key, the key exchange including a user interaction, the communications system comprising means for providing, at least partly by means of a user interaction, a passcode to the first and second communications units;

means for generating a first contribution to the shared secret key by the first communications unit and a second contribution to the shared secret key by the second communications unit;

means for transmitting each generated contribution to the corresponding other communications unit;

means for authenticating, using a message authentication code and the passcode, the transmitted first and second contributions by the corresponding receiving communications unit; and means for establishing said shared secret key by each of the communications units from at least the corresponding received first or second contribution, only if the corresponding received contribution is authenticated successfully.

14. A communications system according to claim 13, wherein the first communications unit comprises processing means adapted to generate the passcode and output means for providing the generated passcode to the second communications unit via a second communications channel different from the first communications channel.

15. A communications system according to claim 13, wherein the first and second communications units each comprise processing means for calculating a tag value of a message authentication code, the tag value being calculated from the first contribution and the passcode.

16. A communications system according to claim 15, wherein the processing means are adapted to calculate the tag value by selecting a symbol of a codeword of an error correcting code, the codeword corresponding to the first contribution, and the symbol being identified by the passcode.

17. A communications system according to claim 16, wherein the processing means are further adapted to calculate a hash value of a one-way hash function from the first contribution and to calculate said tag value by selecting a symbol of a codeword of an error correcting code, the codeword corresponding to the hash value of the first contribution, and the symbol being identified by the passcode.

18. A communications system according to claim 16, wherein the error correcting code is a Reed-Solomon code.

19. A communications unit for providing secure communications with another communications unit by means of a key exchange resulting in a shared secret key, the key exchange including a user interaction, the communications unit comprising data processing means, user-interface means, and a communications interface, the processing means being adapted to perform the following steps:

generating a passcode to be provided at least partly by means of a user interaction via the user-interface means, to the other communications unit;

generating and transmitting via the communications interface a first contribution to the shared secret key, and receiving via the communications interface a second contribution to the shared secret key, the second contribution being generated by the other communications unit;

authenticating, using a message authentication code and the passcode, the received second contribution; and establishing said shared secret key from at least the second contribution, only if the received second contribution is authenticated successfully.

20. A communications unit according to claim 19, wherein the processing means is further adapted to calculate a tag value of a message authentication code to be provided to the other communications unit, the tag value being calculated from the first contribution and the passcode.

21. A communications unit according to claim 20, wherein the processing means is further adapted to calculate the tag value by selecting a symbol of a codeword of an error correcting code, the codeword corresponding to the first contribution, and the symbol being identified by the passcode.

22. A communications unit according to claim 21, wherein the processing means is further adapted to calculate a hash value of a one-way hash function from the first contribution and to calculate said tag value by selecting a symbol of a codeword of an error correcting code, the codeword corresponding to the hash value of the first contribution, and the symbol being identified by the passcode.

23. A communications unit according to claim 21, wherein the error correcting code is a Reed-Solomon code.

24. A communications unit according to claim 19, wherein the processing means is further adapted to decrypt an encrypted passcode received together with the second contribution, the decrypting using said shared secret key, and is further adapted to accept the received second contribution only if the decrypted passcode corresponds to the generated passcode.

25. A communications unit for providing secure communications with another communications unit by means of a key exchange resulting in a shared secret key, the key exchange including a user interaction, the communications unit comprising data processing means, storage means, and a communications interface, the processing means being adapted to perform a key exchange resulting in a shared secret key, the key exchange comprising:
   receiving, at least partly by means of a user interaction, and storing a passcode generated by another communications unit;
   receiving via the communications interface a first contribution to the shared secret key generated by the other communications unit;
   authenticating, using a message authentication code and the passcode, the received first contribution; and
   if the received first contribution is authenticated successfully, establishing said shared secret key from at least the first contribution, and transmitting via the communications interface a second contribution to the shared secret key.

26. A communications unit according to claim 25, further adapted to store a message authentication tag in the storage means, and wherein the processing means is adapted to calculate a tag value of a message authentication code from the received first contribution and the passcode, and is adapted to accept the received first contribution only of the calculated tag value corresponds to the stored message authentication tag.

27. A communications unit according to claim 26, wherein the processing means is further adapted to calculate the tag value by selecting a symbol of a codeword of an error correcting code, the codeword corresponding to the first contribution, and the symbol being identified by the passcode.

28. A communications unit according to claim 27, wherein the processing means is further adapted to calculate a hash value of a one-way hash function from the first contribution and to calculate said tag value by selecting a symbol of a codeword of an error correcting code, the codeword corresponding to the hash value of the first contribution, and the symbol being identified by the passcode.

29. A communications unit according to claim 27, wherein the error correcting code is a Reed-Solomon code.

30. A communications unit according to claim 25, wherein the processing means is further adapted to encrypt the stored passcode, the encrypting using said shared secret key, and is further adapted to transmit the encrypted passcode with the second contribution via the communications interface to the other communications unit.

31. A computer program product configured to provide secure communications between a first and a second communications unit, comprising:
   a computer readable storage medium having computer readable program code embodied therein, the computer readable program code comprising:
   computer readable program code for exchanging a key between the first and the second communications units to generate a shared secret key and to receive input from a user;
   computer readable program code for providing, at least partly by means of a user interaction, a passcode to the first and second communications units;
   computer readable program code for generating a first contribution to the shared secret key by the first communications unit and a second contribution to the shared secret key by the second communications unit, and transmitting each generated contribution to the corresponding other communications unit;
   computer readable program code for authenticating, using a message authentication code and the passcode, the transmitted first and second contributions by the corresponding receiving communications unit; and
   computer readable program code for establishing said shared secret key by each of the communications units from at least the corresponding received first or second contribution, only if the corresponding received contribution is authenticated successfully.

32. A computer program product configured to provide secure communications with a communications unit, comprising:
   a computer readable storage medium having computer readable program code embodied therein, the computer readable program code comprising:
   computer readable program code for exchanging a key with the communication unit to generate a shared secret key and to receive input from a user;
   computer readable program code for generating a passcode to be provided based on user input to the communication unit;
   computer readable program code for generating and transmitting a first contribution to the shared secret key, and receiving a second contribution to the shared secret key, the second contribution being generated by the communication unit;
   computer readable program code for authenticating the received second contribution based on the passcode and a message authentication code; and
   computer readable program code for establishing the shared secret key from at least the second contribution, based on whether the received second contribution is authenticated.

* * * * *